(12) United States Patent
Troise et al.

(10) Patent No.: US 9,422,769 B2
(45) Date of Patent: Aug. 23, 2016

(54) FORCE-BALANCING MECHANISMS ESPECIALLY USEFUL FOR ASSISTED LIFTING/LOWERING OF AIRCRAFT STAIRS

(71) Applicant: EMBRAER S.A., São José dos Campos/SP (BR)

(72) Inventors: Rodrigo Tadeu Aparecido Malange Troise, São José dos Campos/SP (BR); Gustavo Venancio Lopes, São José dos Campos/SP (BR); Guillherme Augusto Garcia Borges, São José dos Campos/SP (BR); Carlos Alberto Vilela De Magalhães, São José dos Campos/SP (BR); Marco Antonio Arisseto, São José dos Campos/SP (BR); Fransérgio De Alcântara Santana, São José dos Campos/SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 314 days.

(21) Appl. No.: 14/074,937

(22) Filed: Nov. 8, 2013

(65) Prior Publication Data

US 2015/0129719 A1     May 14, 2015

(51) Int. Cl.
*B64C 1/24*     (2006.01)
*E06C 5/42*     (2006.01)

(52) U.S. Cl.
CPC ... *E06C 5/42* (2013.01); *B64C 1/24* (2013.01); *Y10T 16/84* (2015.01)

(58) Field of Classification Search
CPC ............... E06C 5/04; E06C 5/42; B64C 1/24; Y10T 16/84; B66F 11/04; B60R 3/02; B64F 1/315; E04F 11/06
See application file for complete search history.

(56) References Cited

U.S. PATENT DOCUMENTS

| | | | | |
|---|---|---|---|---|
| 3,403,749 A | * | 10/1968 | Warren | B64C 1/24 182/106 |
| 4,669,574 A | * | 6/1987 | Moutot | B64C 1/24 182/106 |
| 5,111,907 A | * | 5/1992 | Kishi | B66F 11/04 182/116 |

FOREIGN PATENT DOCUMENTS

| | | |
|---|---|---|
| CN | 201843277 | 5/2011 |
| GB | 392940 | 5/1933 |
| WO | WO 2011/087386 | 7/2011 |

*Primary Examiner* — Valentina Xavier
(74) *Attorney, Agent, or Firm* — Nixon & Vanderhye P.C.

(57) ABSTRACT

The disclosed embodiments herein are generally directed toward force-balancing mechanisms for weighted members and/or loads. According to one embodiment, the force-balancing mechanism includes at least one gear rack, at least one spring assembly comprising a spring member operatively connected to the at least one gear rack, a pinion gear intermeshed with the at least one gear rack; and a variable radius cam. Rotation of the cam causes the pinion gear to rotate to thereby in turn linearly drive the at least one gear rack and accumulate spring force of the spring member. The spring member may be a compression or a tension spring. Preferably, the spring member is a compression spring.

12 Claims, 6 Drawing Sheets

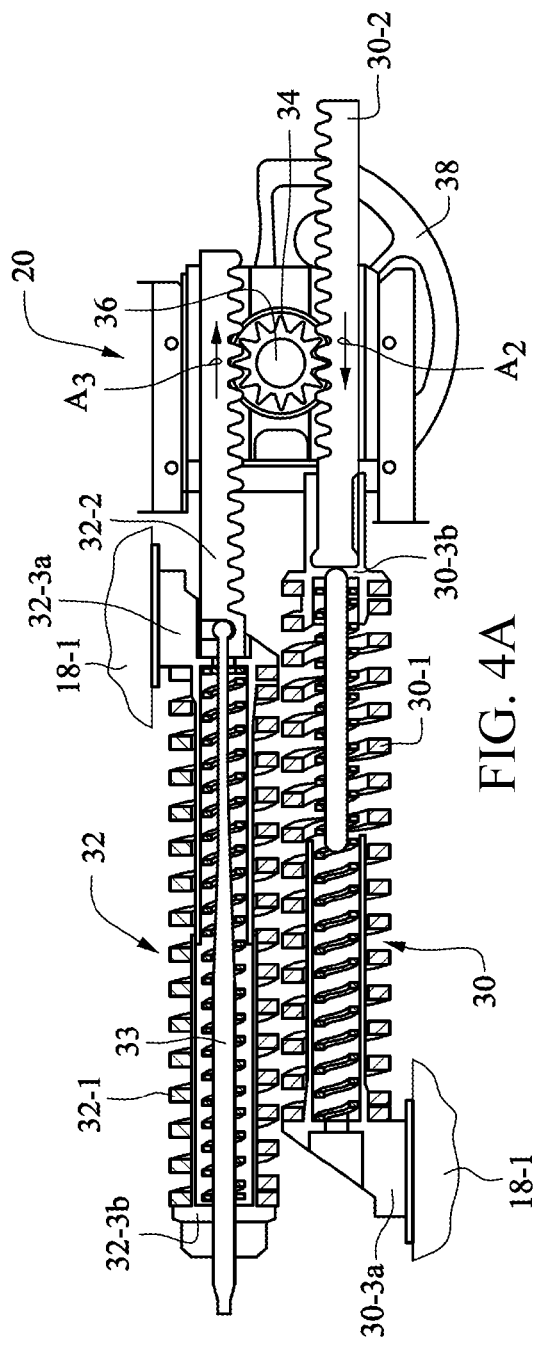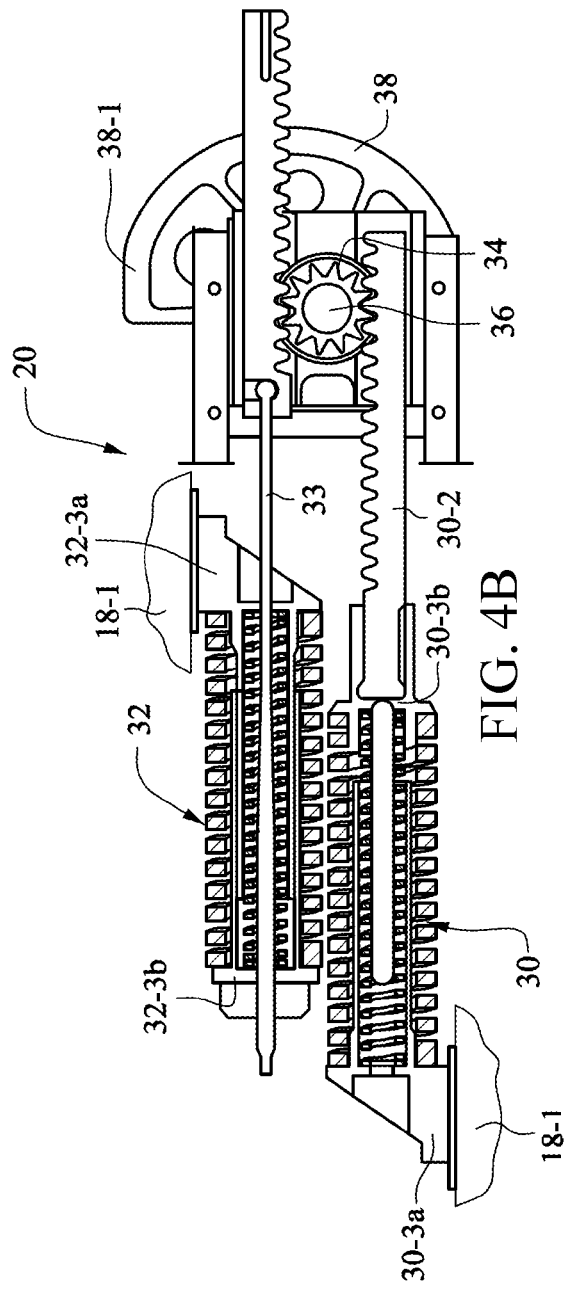
FIG. 4A
FIG. 4B

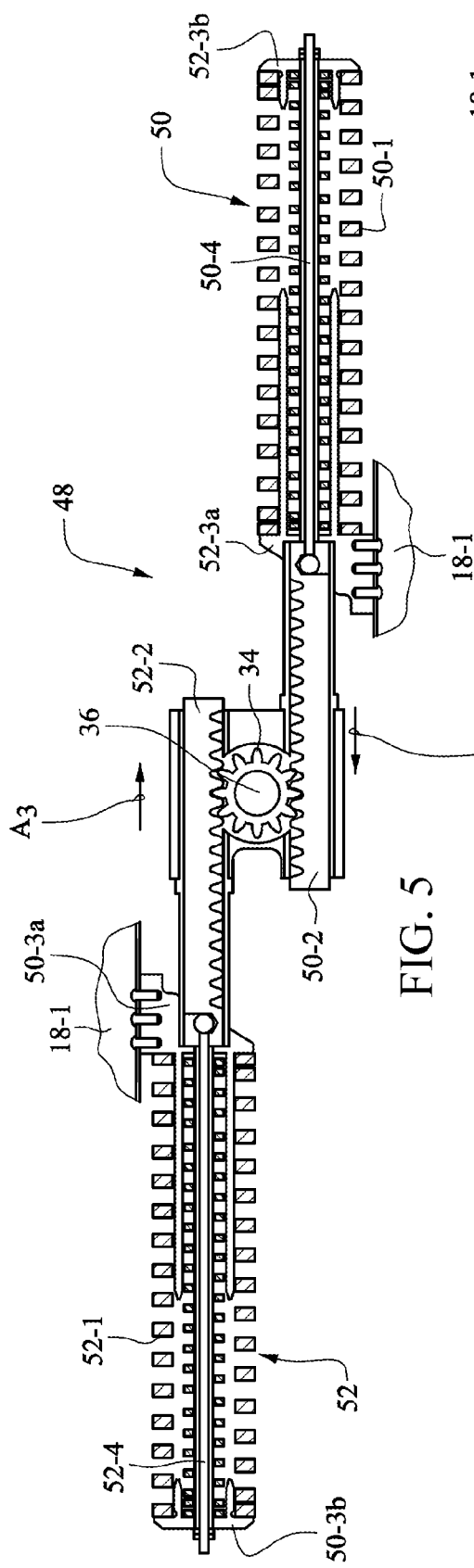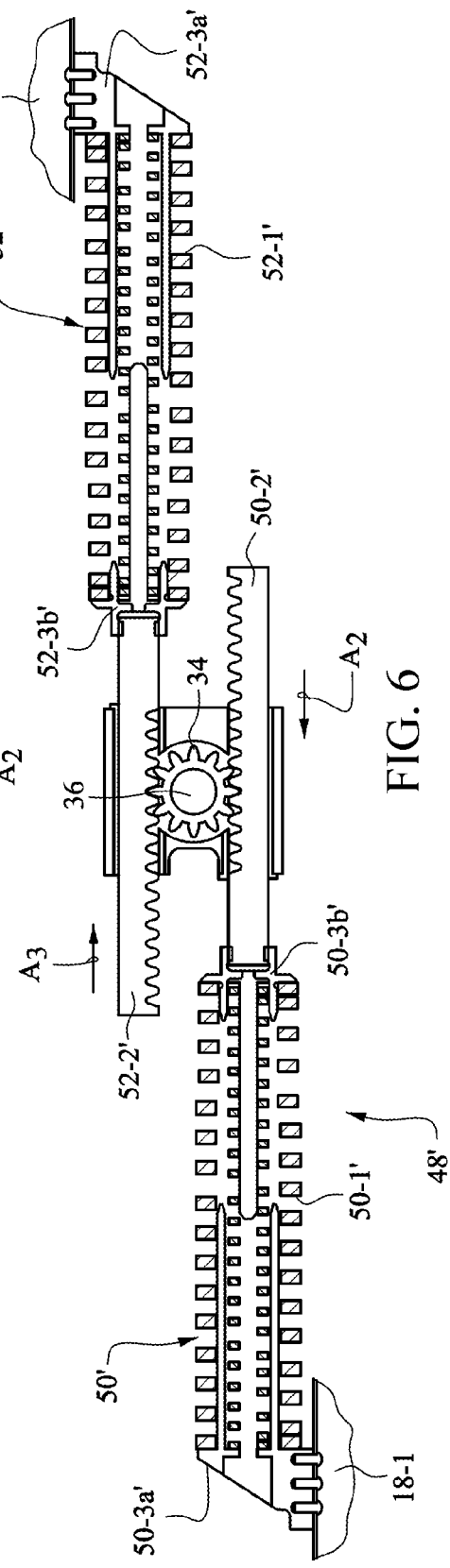

FORCE-BALANCING MECHANISMS ESPECIALLY USEFUL FOR ASSISTED LIFTING/LOWERING OF AIRCRAFT STAIRS

FIELD

The embodiments disclosed herein relate generally to force-balancing mechanisms for weighted members and/or loads. In especially preferred embodiments, force-balancing mechanisms are provided that are usefully employed for the force-assisted lifting/lowering of aircraft stairs.

BACKGROUND

Integrated aircraft stairs to allow passengers to board and disembark when the aircraft fuselage door is opened are colloquially known as "airstairs". Aircraft which include airstairs can thus provide service to many less populated airport environments since a fixed-based gantry platform to allow passengers to board and disembark is not necessarily required. For these reasons, many regional transport and general aviation aircraft are equipped with airstairs as the primary means to allow boarding and disembarking of passenger and aircraft crew members.

In general, most conventional force-balancing mechanisms for airstairs use space-saving torsional bars to accumulate weight energy and power sufficient to provide lift assistance. In this regard, such conventional airstairs will typically employ an actuator/gearbox, which are interconnected by a torsion bar. When the torsion bars are twisted, a large load is accumulated at the ends of the torsion bars which over time results in fatigue failure. When failure occurs, the airstairs may become inoperable resulting in aircraft downtime to allow for repair. As a result, conventional force-balancing mechanisms for airstairs are somewhat problematic due to this continued potential maintenance issue.

What has been needed therefore are space-saving force-balancing mechanisms for loads that are more durable, especially force-balancing mechanisms for loads associated with airstairs for aircraft. It is towards fulfilling such needs for force-balancing mechanisms that the embodiments as disclosed herein are provided.

SUMMARY

The disclosed embodiments herein are generally directed toward force-balancing mechanisms for weighted members and/or loads. According to one embodiment, the force-balancing mechanism comprises at least one gear rack, at least one spring assembly comprising a spring member operatively connected to the at least one gear rack, a pinion gear intermeshed with the at least one gear rack; and a variable radius cam. Rotation of the cam causes the pinion gear to rotate to thereby in turn linearly drive the at least one gear rack and accumulate spring force of the spring member. The spring member may be a compression or a tension spring. Preferably, the spring member is a compression spring.

According to some embodiments the force-balancing mechanism may include a pair of gear racks each intermeshed with the pinion gear, and a pair of spring assemblies. The pair of spring assemblies may be arranged parallel to one another or may be arranged opposite to one another.

The spring assembly may include spaced-apart fixed and moveable end supports between which the spring member is positioned. According to some embodiments, the fixed end support is positioned proximal to the pinion gear and wherein the moveable end support is positioned distal to the pinion gear. A connection rod may be provided to connect the moveable end support to an end of the at least one gear rack. According to other embodiments, the fixed end support is positioned distal to the pinion gear and wherein the moveable end support is positioned proximal to the pinion gear. In such embodiments, the moveable end support may be connected directly to an end of the at least one gear rack.

A flexible actuator cable having one end fixed to a terminal lobe of the cam, and an opposite end for fixed connection to supporting structure (e.g., to aircraft structure supporting an airstair).

The force-balancing mechanism may be usefully employed to force-balance virtually any moveable weighted member or load. In preferred embodiments, the weighted member is an aircraft airstair. Thus, in accordance with other embodiments, the force-balancing mechanism is provided in an aircraft airstair.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 4A and 4B are enlarged detailed side elevational views of an embodiment of a force-balancing mechanism having a dual parallel spring assembly and depicted in force unloaded (stowed) and loaded (deployed) conditions, respectively;

FIG. 5 is an enlarged detailed side elevational view of another embodiment of a force-balancing mechanism having a dual opposed spring assembly and depicted in a force unloaded (stowed) condition;

FIG. 6 is an enlarged detailed side elevational view of a variant of the force-balancing mechanism shown in FIG. 5;

DETAILED DESCRIPTION

Figure 1A:
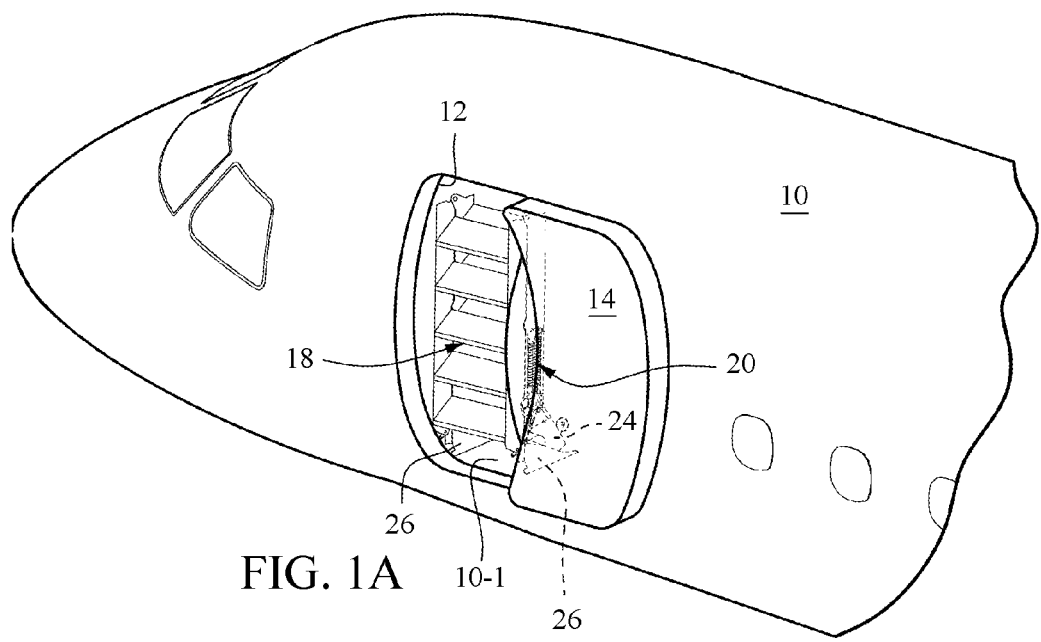
FIGS. 1A and 1B are exterior perspective views of a forward aircraft fuselage showing the associated airstair in stowed and deployed positions, respectively.
Figure 1B:
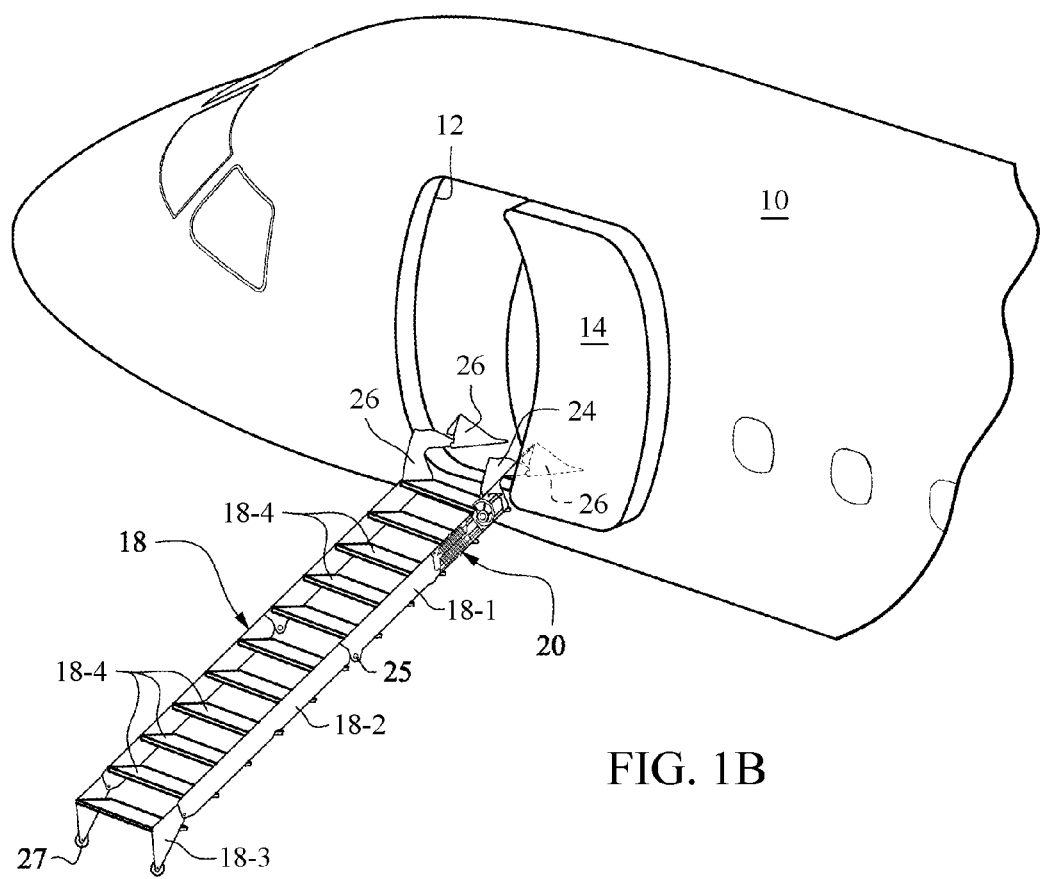

Accompanying FIGS. 1A and 1B are exterior perspective views of a forward section of an aircraft fuselage 10 equipped with a fuselage opening 12 and a conventional door 14 to close the opening 12. A foldable airstair 18 is provided in the opening 12 and is equipped with a force-balancing mechanism 20 according to one embodiment of the present invention.

Figure 2:
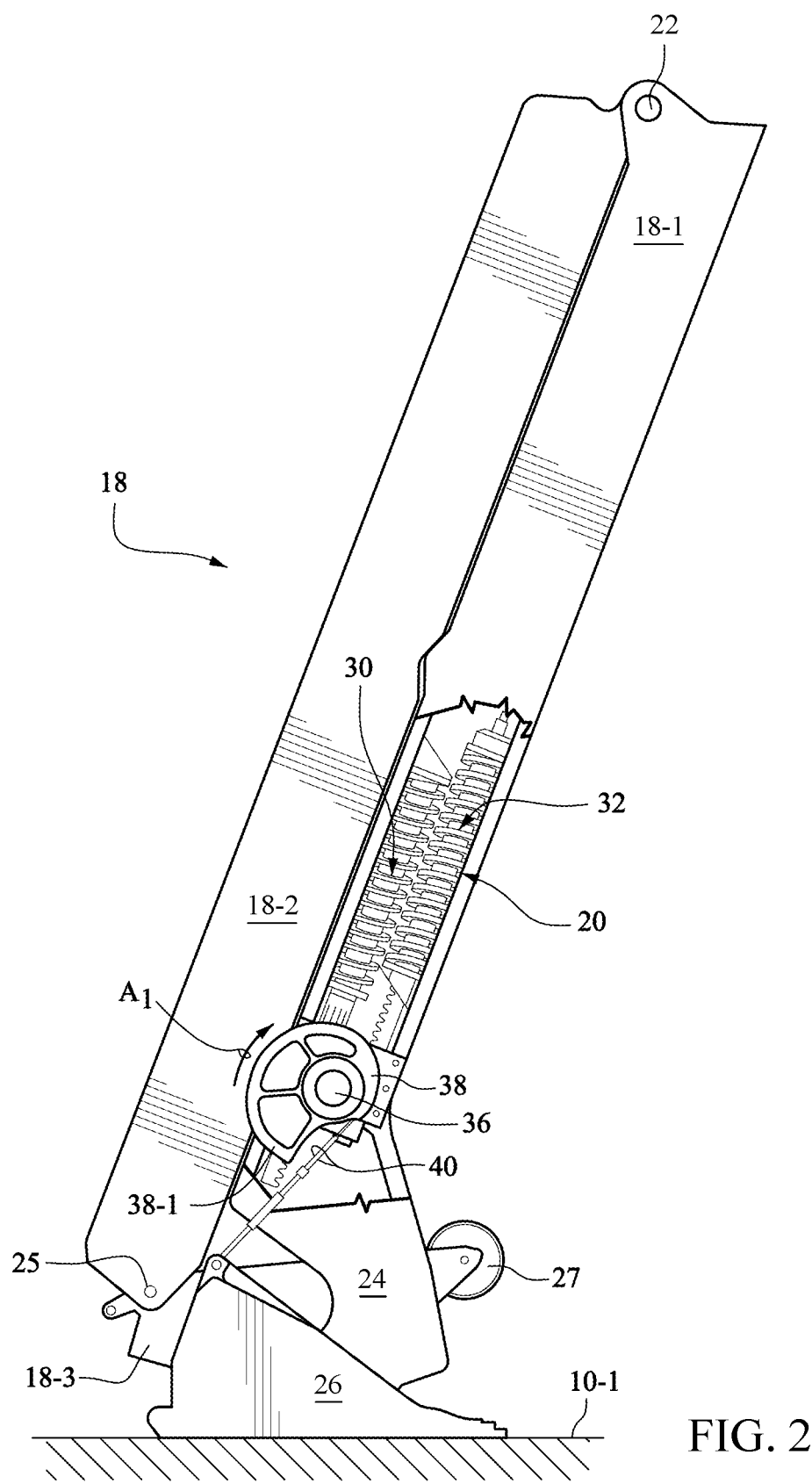
FIG. 2 is an enlarged detail view of an airstair in a stowed position.
Figure 3:
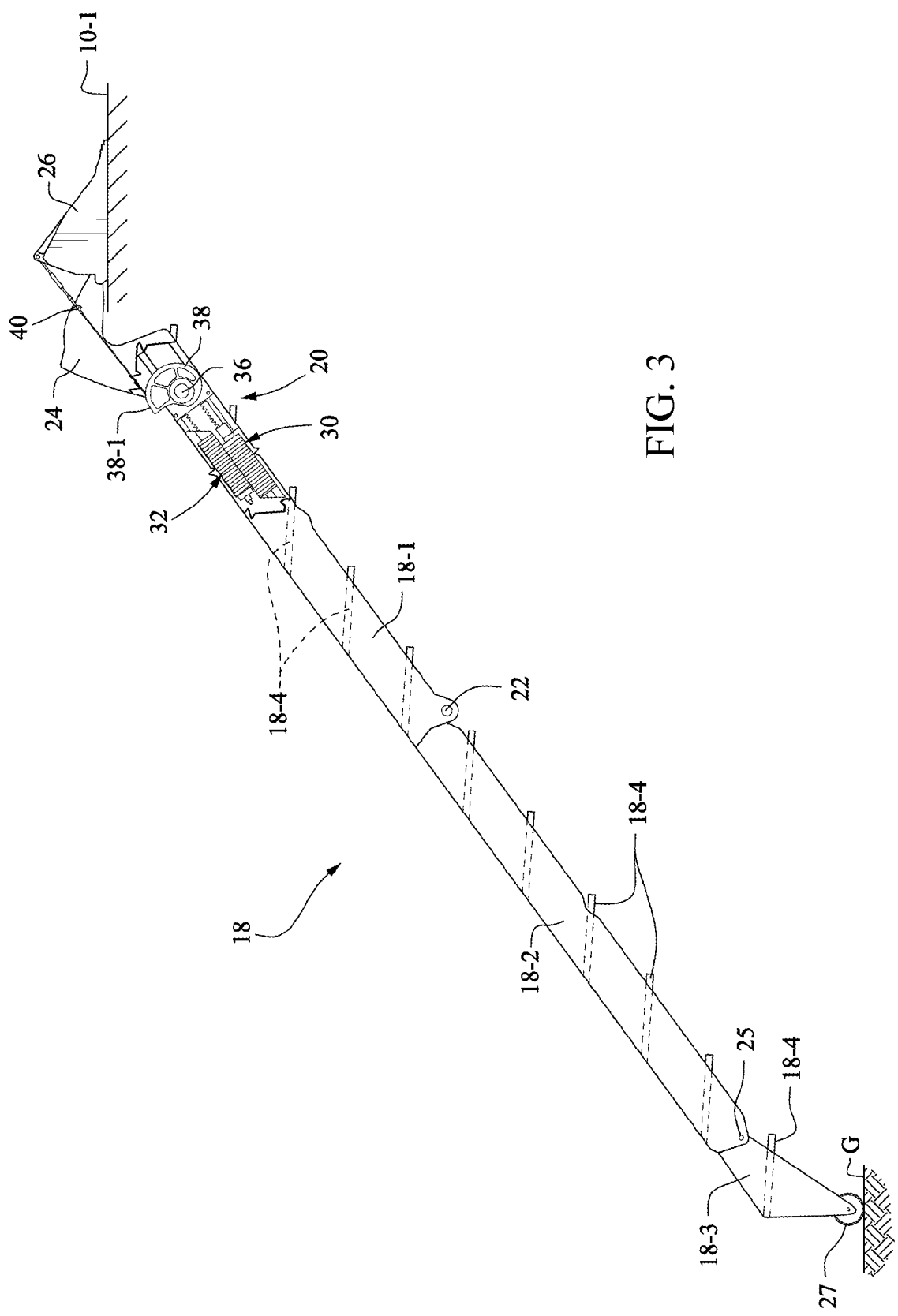
FIG. 3 is an enlarged detail view of an airstair in a deployed position.

Accompanying FIGS. 2-3 depict the airstair 18 in greater detail in stowed and deployed conditions, respectively. In this regard, it will be observed that the airstair is provided with respective upper and lower (relative to airstair deployment) airstair sections 18-1, 18-2, respectively, connected together at hinge point 22 to allow relative hinged articulation therebetween. An upper end of the upper section 18-1 includes an attachment bracket 24 which is connected to a fixed base 26 for pivotal movements about a generally horizontal pivot axis. The base 26 is rigidly connected to supporting structure 10-1 associated with the aircraft fuselage 10. A ground-engaging section 18-3 is pivotally hinged to the lower free end of the lower airstair section 18-2 at hinge connection 25 so as to be pivotal between a stowed condition (see FIG. 2) and a deployed condition (see FIG. 3). Wheels 27 are provided with the section 18-3 so as to engage the ground G when the airstair 18 is fully deployed. The airstair sections 18-1, 18-2 and 18-3 are provided with stair treads 18-4 to allow passengers and crew members to board and disembark when the airstair 18 is in a deployed condition.

The force-balancing mechanism 20 employed in the airstair 18 is depicted in greater detail in accompanying FIGS. 4A and 4B. In this regard, the force-balancing mechanism 20 is depicted by FIGS. 4A and 4B in a common orientation so that the structural positioning of the various components in force-unloaded and force-loaded conditions corresponding to the airstair stowed and deployed conditions, respectively, can be readily discerned. Thus, it will be understood that when in the force-unloaded condition depicted by FIG. 4A, the force-balancing mechanism 20 will be in a position with the airstair 18 as depicted by FIG. 2, whereas when in the force-loaded condition depicted by FIG. 4B, the force-balancing mechanism will be in a position with the airstair 18 as depicted in FIG. 3.

The embodiment of the force-balancing mechanism 20 depicted in FIGS. 4A and 4B is generally comprised of a pair of parallel helical compression spring assemblies 30, 32 which include helical compression springs 30-1, 32-1 coupled operatively to rack gears 30-2, 32-2, respectively. More specifically, each of the springs 30-1, 32-1 is mounted between fixed and moveable end supports 30-3a, 32-3a and 30-3b, 32-3b, respectively. The fixed end supports 30-3a, 32-3a are thus immovably fixed to structure associated with the upper airstair section 18-1 (a portion of which is shown in FIGS. 4A and 4B), while the movable end supports 30-3b, 32-3b are fixed to and moveable with the rack gears 30-2, 32-2, respectively. It will be observed in this regard that the moveable end support 30-3b is connected directly to an end of the rack gear 30-2 whereas the moveable end support 32-3b is connected to the rack gear 32-2 by way of an elongate connection rod 33.

The rack gears 30-2, 32-2 are meshed with a pinion gear 34 which is mounted to the pinion axle 36 for rotational movement about the axis thereof. A continually variable radius ("nautilus-type") cam 38 is also connected to the pinion axle 36 so as to be rotatable as a unit with the pinion gear 34 about the axis of the pinion axle 36 (i.e. as shown by arrow $A_1$ in FIG. 2). The profile of the nautilus-type cam 38 is such that a different radius is presented at successive different degrees of rotation thereof to provide moment arms of varying lengths as the cam 38 is rotated about the axis of the axle 36.

As is perhaps best shown in FIGS. 2 and 3, a flexible actuator cable 40 is provided with one end pivotally connected to the fixed base 26 and an opposite end connected to the terminal lobe 38-1 of cam 38. Thus, as the upper airstair section 18-1 pivots from its stowed position to a deployed condition, the actuator cable 40 will cause the cam 38, and hence the pinion gear 36, to rotate in the direction of arrow $A_1$. Rotation of the pinion gear 36 will in turn cause the rack gears 30-2, 32-2 to move linearly in the direction of arrows $A_2$ and $A_3$ as shown in FIG. 4A thereby compressing each of the compression springs 30-1 and 32-1, respectively. Thus, as the upper airstair section 18-1 pivots from its stowed position to a deployed condition, the force-balance mechanism 20 will translate from its force-unloaded condition as shown in FIG. 4A (i.e., whereby the compression springs 30-1, 32-1 have minimal if any stored compression force) to a force-loaded condition as shown in FIG. 4B (i.e., whereby the compression springs 30-1, 32-1 have substantial or maximum stored compression force). The loaded compression force that is accumulated when the upper airstair section 18-1 is in its deployed condition may thereby be used to provide force-assisted movement back to the stowed condition from the deployed condition thereof (i.e., when the cam 40 is rotated in a direction opposite to arrow $A_1$).

Accompanying FIGS. 5-9 depict other embodiments of force-balancing mechanisms according to the invention. In this regard, although not depicted in FIGS. 5-9, the embodiments shown will include a continually variable radius ("nautilus-type") cam of the type shown, for example by reference numeral 38 in FIGS. 4A and 4B which is connected to the pinion axle 36 so as to be rotatable as a unit with the pinion gear 34 about the axis of the pinion axle 36. Thus, such a cam 38 will similarly be connected to a fixed base structure 26 via an actuator cable 40 or like mechanisms as described previously.

The force-balancing mechanism 50 depicted by FIG. 5 is a variant of the dual spring assembly mechanism 20 described above. Specifically, it will be observed that the mechanism 48, like the mechanism 20, has dual compression spring assemblies 50, 52. However, unlike the mechanism 20, the mechanism 48 is arranged so that the compression spring assemblies 50, 52 are opposite to one another. Thus, the spring assemblies 52 include helical compression springs 50-1, 52-1 coupled operatively to rack gears 50-2, 52-2, respectively. More specifically, each of the springs 50-1, 52-1 is mounted between fixed and moveable end supports 50-3a, 52-3a and 50-3b, 52-3b, respectively. The fixed end supports 50-3a, 52-3a are thus immovably fixed to structure associated with the upper airstair section 18-1 (a portion of which is shown in FIG. 5) at a position proximal to the pinion gear 36, while the movable end supports 50-3b, 52-3b are fixed to and moveable with the rack gears 50-2, 52-2, respectively, at a position distal to the pinion gear 36. It will be observed in this regard that the moveable end supports 50-3b, 52-3b are connected to an end of the rack gears 50-2, 52-2 by way of an elongate connection rod 50-4, 52-4, respectively.

Rotation of the pinion gear 38 in the manner described above during pivotal movement of the upper airstair section 18-1 into the deployed condition thereof will thus linearly drive each of the rack gears 50-2 and 52-2 in the direction of arrows $A_2$ and $A_3$ thereby causing the springs 50-1, 52-1 to be compressed. As such, the force-balancing mechanism 48 is caused to assume a force-loaded condition so that the accumulated spring force is available to assist when the upper airstair section is moved back into its stowed condition.

FIG. 6 depicts a variant of the embodiment shown in FIG. 5 whereby similar structural elements are noted by a prime (') symbol. As shown, the embodiment of FIG. 6 includes fixed position end supports 50-3a', 52-3a' which are distal to the pinion gear 38 and moveable end supports 50-3b', 52-3b' that are proximal to the pinion gear 38 (i.e., generally opposite to the embodiment shown by FIG. 5). The moveable end supports 50-3b', 52-3b' are moreover fixed directly to an end of the rack gears 50-2', 52-2' (thereby avoiding the need for the connection rods 50-4, 52-4 of the embodiment shown by FIG. 5). In a similar manner, however, during pivotal movement of the upper airstair section 18-1 into the deployed condition thereof, each of the rack gears 50-2' and 52-2' will be driven linearly in the direction of arrows $A_2$ and $A_3$ thereby causing the springs 50-1', 52-1' to be compressed. As such, the force-balancing mechanism 48' is caused to assume a force-loaded condition so that the accumulated spring force is available to assist when the upper airstair section is moved back into its stowed condition.

Figure 7:
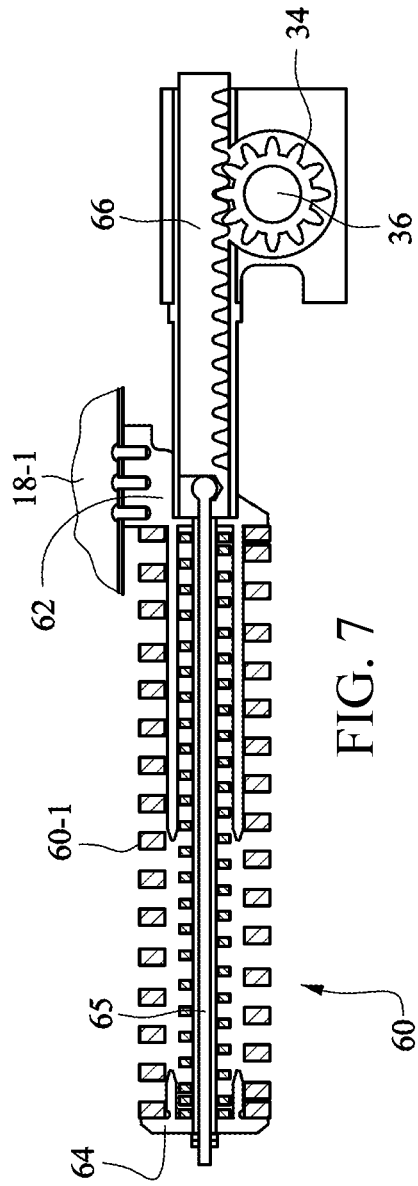
FIG. 7 is an enlarged detailed side elevational view of an embodiment of a force-balancing mechanism employed in the airstair having a single spring assembly and depicted in force unloaded (stowed) condition.
Figure 8:
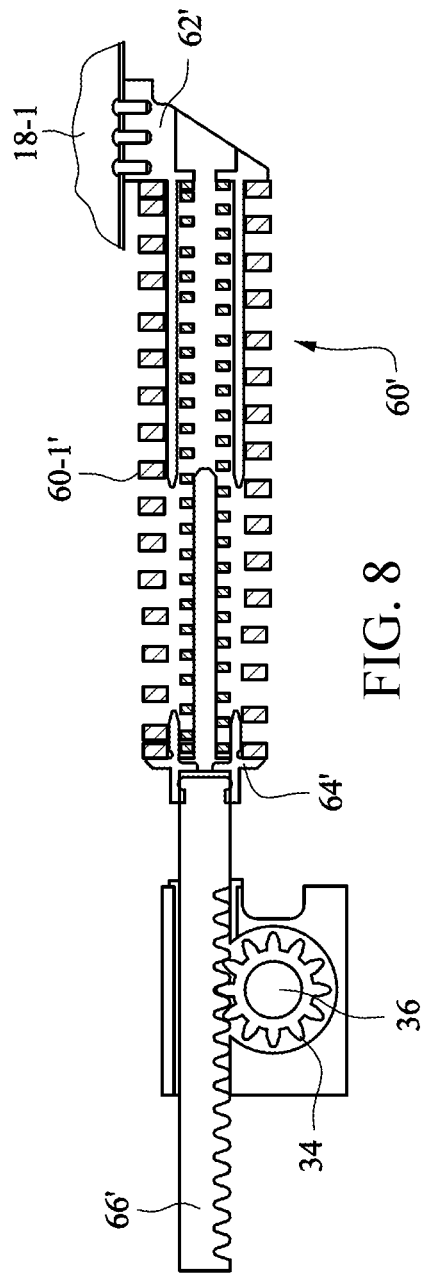
FIG. 8 is an enlarged detailed side elevational view of a variant of the force-balancing mechanism shown in FIG. 7.

Single compression spring embodiments of the force-balancing mechanisms are shown in FIGS. 7 and 8 and may be used in those instances where lighter duty requirements are needed (i.e., thereby avoiding the weight penalty of a second compression spring and its associated components while yet still providing for sufficient force assistance). More specifically, the force balancing mechanism 60 as shown in FIG. 7 includes a single compression spring 60-1 mounted between a fixed end support 62 connected to the upper airstair section 18-1 at a position proximal to the pinion gear 36, and a moveable end support 64 positioned distal to the pinion gear 36. The moveable end support 64 is connected to the gear rack 66 by way of a connection rod 65. Rotation of the pinion gear 36 during movement of the upper airstair section 18-1 from its stowed condition to the deployed condition will therefore effect force-loading in a similar manner to that described above in connection with spring assembly 52 of FIG. 5.

The force balancing mechanism 60' as shown in FIG. 8 includes a single compression spring 60-1' mounted between a fixed end support 62' connected to the upper airstair section 18-1 at a position distal to the pinion gear 36, and a moveable end support 64' positioned proximal to the pinion gear 36. The moveable end support 64' is directly connected to an end of the gear rack 66' (thereby avoiding the need of the connection rod 65 as shown in FIG. 7). Rotation of the pinion gear 36 during movement of the upper airstair section 18-1 from its stowed condition to the deployed condition will therefore effect force-loading in a similar manner to that described above in connection with spring assembly 52' of FIG. 6.

It will be appreciated that the force-balancing mechanisms in accordance with the various embodiments have been described in connection with an especially preferred end-use application, that is as a force-balancing mechanism for aircraft airstairs. However, the force-balancing mechanisms as described herein could also be suitable used for virtually any purpose where mechanical lift and/or deployment force-assistance is desired for virtually any weighted member, for example, doors, hatches, gantry platforms, overhead stairs and the like. Thus, the use of the force-balancing mechanisms for assisting in the stowage/deployment of airstairs as described herein is understood to be a presently preferred, but non-limiting, embodiment thereof.

Furthermore, it is currently envisioned that compression springs are preferred. However, those skilled in this art could envision modifications which employ tension springs in which case such modifications are entirely within the scope of the embodiments as described herein.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A force-balanced aircraft airstair assembly comprising:
   (a) an airstair; and
   (b) a force-balancing mechanism operatively associated with the airstair, wherein the force-balancing mechanism comprises,
      at least one gear rack;
      at least one spring assembly comprising a spring member operatively connected to the at least one gear rack;
      a pinion gear intermeshed with the at least one gear rack;
      a variable radius cam; and
      a flexible actuator cable having one end fixed to a terminal lobe of the cam and an opposite end fixed to supporting structure for the airstair.

2. The assembly of claim 1, wherein the airstair comprises upper and lower airstair sections connected to one another for relative hinged articulated movement between stowed and deployed conditions, and wherein the force-balancing mechanism is operatively associated with the upper airstair section.

3. The assembly of claim 1, which comprises a pair of gear racks each intermeshed with the pinion gear, and a pair of spring assemblies.

4. The assembly of claim 3, wherein the pair of spring assemblies is arranged parallel to one another.

5. The assembly of claim 4, wherein the pair of spring assemblies is arranged opposite to one another.

6. The assembly of claim 1, wherein the at least one spring assembly includes spaced-apart fixed and moveable end supports, wherein the spring member is positioned between the end supports.

7. The assembly of claim 6, wherein the fixed end support is positioned proximal to the pinion gear and wherein the moveable end support is positioned distal to the pinion gear.

8. The assembly of claim 7, which comprises a connection rod to connect the moveable end support to an end of the at least one gear rack.

9. The assembly of claim 6, wherein the fixed end support is positioned distal to the pinion gear and wherein the moveable end support is positioned proximal to the pinion gear.

10. The assembly of claim 9, wherein the moveable end support is connected directly to an end of the at least one gear rack.

11. The assembly of claim 1, wherein the spring member is a compression spring.

12. An aircraft which comprises the assembly of claim 1.

* * * * *